US008483529B2

United States Patent
Zhang et al.

(10) Patent No.: US 8,483,529 B2
(45) Date of Patent: Jul. 9, 2013

(54) WAVEGUIDE-BASED DISPERSION DEVICE

(75) Inventors: Lin Zhang, Los Angeles, CA (US); Yang Yue, Los Angeles, CA (US); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 240 days.

(21) Appl. No.: 13/021,667

(22) Filed: Feb. 4, 2011

(65) Prior Publication Data

US 2011/0206323 A1    Aug. 25, 2011

Related U.S. Application Data

(60) Provisional application No. 61/301,518, filed on Feb. 4, 2010.

(51) Int. Cl.
   *G02B 6/26*       (2006.01)
   *G02B 6/132*     (2006.01)
   *H01L 21/00*     (2006.01)

(52) U.S. Cl.
   USPC .......... 385/50; 385/122; 385/131; 427/163.2; 438/31

(58) Field of Classification Search
   USPC ................. 385/14, 129, 130, 131, 132, 141, 385/122, 42, 41, 39, 40, 50; 398/81; 427/163.2; 438/31
   See application file for complete search history.

(56) References Cited

U.S. PATENT DOCUMENTS

| | | | |
|---|---|---|---|
| 6,643,429 B2* | 11/2003 | Robinson et al. | 385/37 |
| 7,339,724 B2* | 3/2008 | Hochberg et al. | 359/335 |
| 7,424,192 B2* | 9/2008 | Hochberg et al. | 385/122 |
| 7,894,696 B2* | 2/2011 | Baehr-Jones et al. | 385/122 |
| 2008/0007817 A1* | 1/2008 | Hochberg et al. | 359/333 |
| 2010/0322559 A1* | 12/2010 | Ogawa et al. | 385/37 |
| 2011/0206323 A1* | 8/2011 | Zhang et al. | 385/50 |

OTHER PUBLICATIONS

Almeida et al., "Guiding and Confining Light in Void Nanostructure," Jun. 1, 2004, Optics Letters 29(11):1209-1211, 3 pages.
Baehr-Jones et al., "Optical Modulation and Detection in Slotted Silicon Waveguides," Jun. 2005, Optic Express 13 (14):5216-5226, 11 pages.
Dulkeith et al., "Group Index and Group Velocity Dispersion in Silicon-On-Insulator Photonic Wires," 2006, Optics Express 14, 3853-3863, 11 pages.
Fujisawa et al., "Guided modes of nonlinear slot waveguides," Jul. 15, 2006, IEEE Photonics Technology Letters 18 (14):1530-1532, 3 pages.

(Continued)

*Primary Examiner* — Brian Healy
(74) *Attorney, Agent, or Firm* — Fish & Richardson P.C.

(57) ABSTRACT

Systems, devices, and techniques are disclosed relating to dispersion devices that include a slot waveguide coupled with another waveguide such as a strip waveguide. For example, one or more structural parameters can be obtained for a dispersion device, including a slot waveguide coupled to a strip waveguide, to cause the dispersion device to produce dispersion, having a dispersion profile, for an electromagnetic wave propagated through the dispersion device, the one or more structural parameters including one or more of a slot thickness for a slot of the slot waveguide or a spacing thickness between the slot waveguide and the other waveguide; and making the dispersion device, including the slot waveguide and the other waveguide, according to the structural parameters.

33 Claims, 16 Drawing Sheets

OTHER PUBLICATIONS

Garrett et al., "Cascaded Chirped Fiber Gratings for 18-nm-Bandwidth Dispersion Compensation," Mar. 2000, IEEE Photonics Technology Letters, vol. 12, pp. 356-358, 3 pages.

Geraghty et al., "A Simplified Optical Correlator and Its Application to Packet-Header Recognition," Apr. 1, 2008, IEEE Photonics Technology Letters 20, 487-489, 3 pages.

Kashyap et al., "On the group delay characteristics of chirped fibre Bragg gratings," Jul. 15, 1998, Optics Communications, vol. 153:19-22, 4 pages.

Madsen et al., "Multistage Dispersion Compensator Using Ring Resonators," Nov. 15, 1999, Optics Letters 24 (22):1555-1557, 3 pages.

Peschel et al., "A compact device for highly efficient dispersion compensation in fiber transmission," Aug. 2, 1995, Applied Physics Letters, vol. 67, pp. 2111-2113, 3 pages.

Poletti et al., "Inverse Design and Fabrication Tolerances of Ultra-Flattened Dispersion Holey Fibers," 2005, Optics Express 13(10):3728-3736, 9 pages.

Ren et al., "12.47ns Continuously-Tunable Two-Pump Parametric Delay," Sep. 24-28, 2006, European Conference on Optical Communication, 2 pages.

Sharping et al., "All-Optical, Wavelength and Bandwidth Preserving, Pulse Delay Based on Parametric Wavelength Conversion and Dispersion," 2005, Optics Express 13, 7872-7877, 6 pages.

Subbaraman et al., "Design of A Broadband Highly Dispersive Pure Silica Photonic Crystal Fiber," May 15, 2007, Appl. Optics 46, 3263-3268, 6 pages.

Sun et al., "Horizontal single and multiple slot waveguides: optical transmission at λ= 1550 nm," Dec. 2007, Opt. Express 15(26):17967-17972, 6 pages.

Taniguchi et al., "Tunable chromatic dispersion and dispersion slope compensator using a planar lightwave circuit lattice-form filter," Jun. 1, 2008, Opt. Lett. 33(11):1243-1245, 3 pages.

Turner et al., "Tailored Anomalous Group-Velocity Dispersion in Silicon Channel Waveguides," 2006, Optics Express 14, 4357-4362, 6 pages.

Turner et al., "Ultra-Low Power Parametric Frequency Conversion In A Silicon Microring Resonator," 2008, Optics Express 16, 4881-4887, 7 pages.

Wang et al., "Continuously-Tunable Dispersionless 44-ns All Optical Delay Element Using a Two-Pump PPLN, DCF, and a Dispersion Compensator," 2005, European Conference on Optical Communication, Paper Th1.3.3, Glasgow, Scotland, 2 pages.

Wang et al., "44-ns Continuously Tunable Dispersionless Optical Delay Element Using a PPLN Waveguide With Two-Pump Configuration, DCF, and a Dispersion Compensator," Jun. 1, 2007, IEEE Photonics Technology Letters, vol. 19, pp. 861-863, 3 pages.

Xu et al,. "Experimental demonstration of guiding and confining light in nanometer-size low-refractive-index material," Jul. 15, 2004, Optics Letters 29(14):1626-1628, 3 pages.

Xu et al., "Micrometer-scale all-optical wavelength converter on silicon," Oct. 15, 2005, Optics Letters 30 (20):2733-2735, 3 pages.

Yang et al., "Giant Birefringence in Multi-Slotted Silicon Nanophotonic Waveguides," 2008, Optics Express 16, 8306-8316, 11 pages.

Zhang et al., "On-chip, high-dispersion-value and coupled strip/slotted waveguide structure for efficient dispersion compensation," Mar. 22, 2009, Optical Fiber Communication Conference, San Diego, CA, 3 pages.

Zheng et al., "Dispersion characteristics of SOI-based slot optical waveguides," 2008, Optics Communications 281:5151-5155, 5 pages.

* cited by examiner

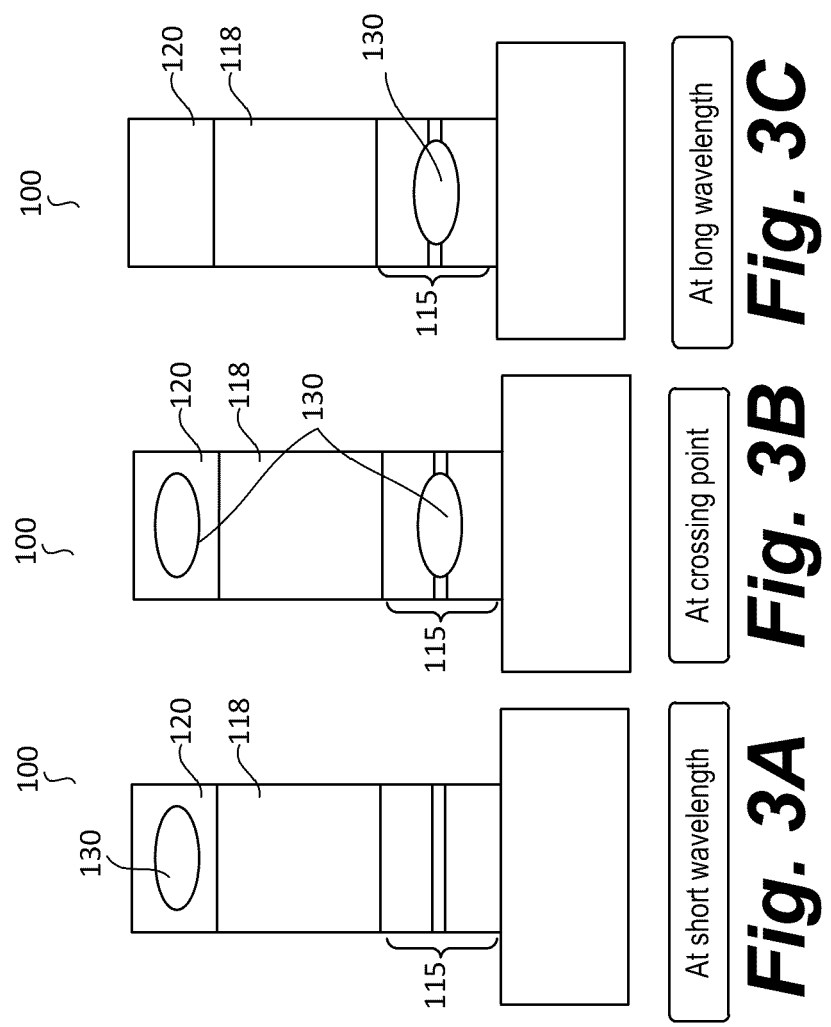

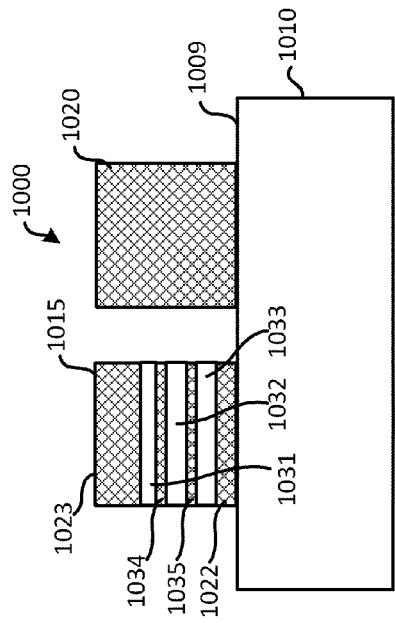
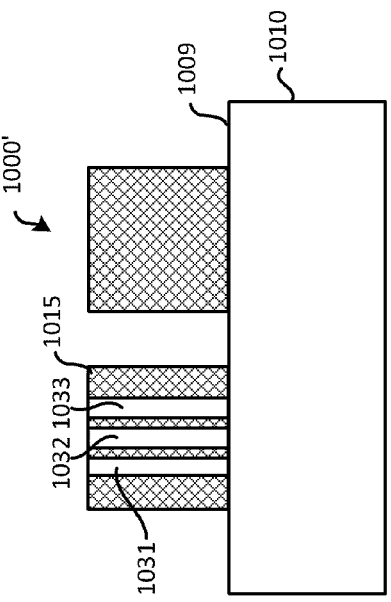
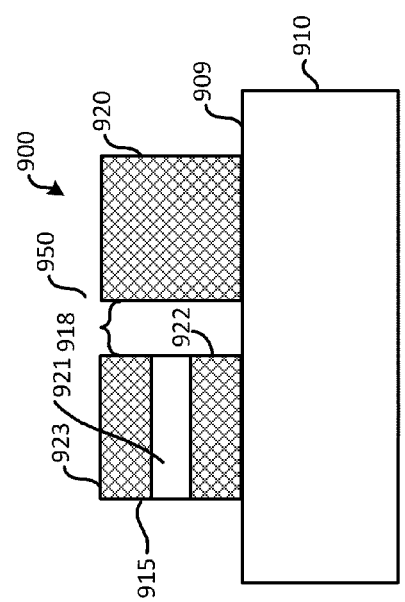
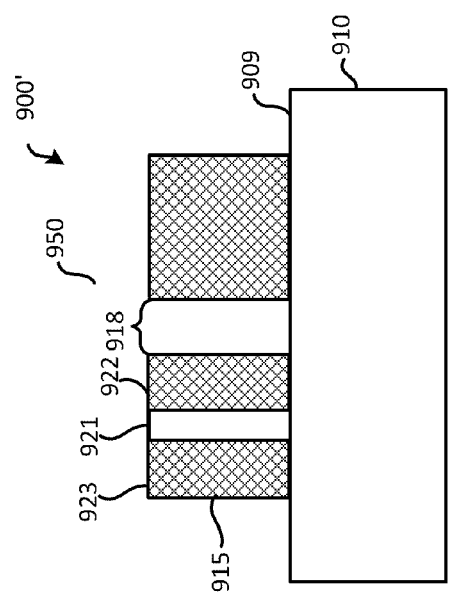
Fig. 10A
Fig. 10B
Fig. 9A
Fig. 9B

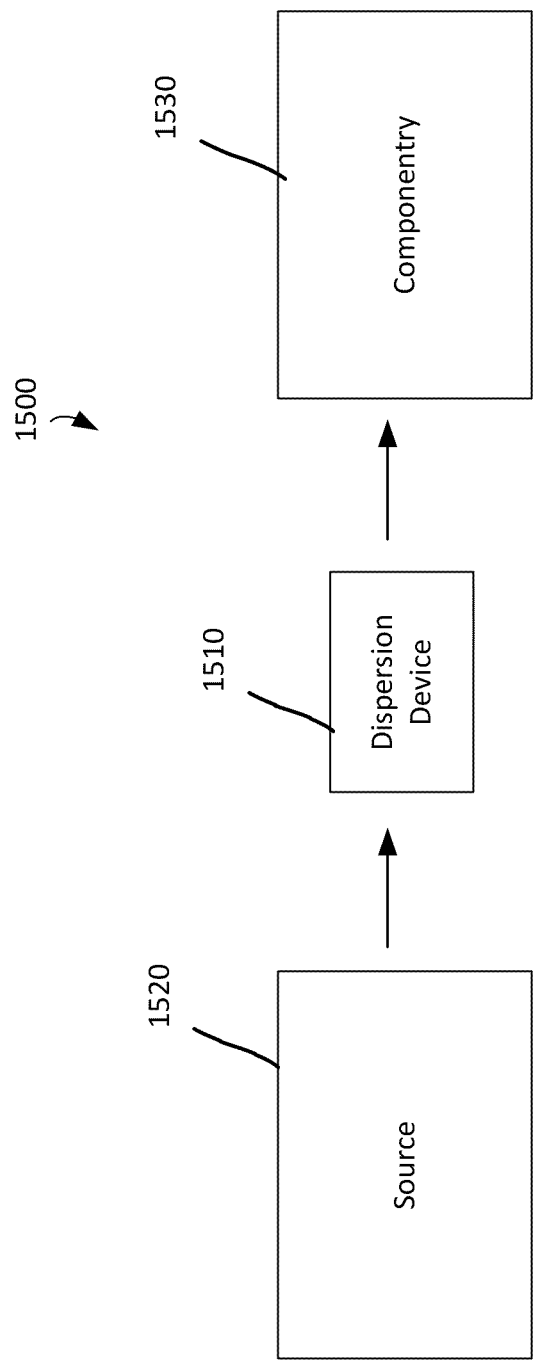

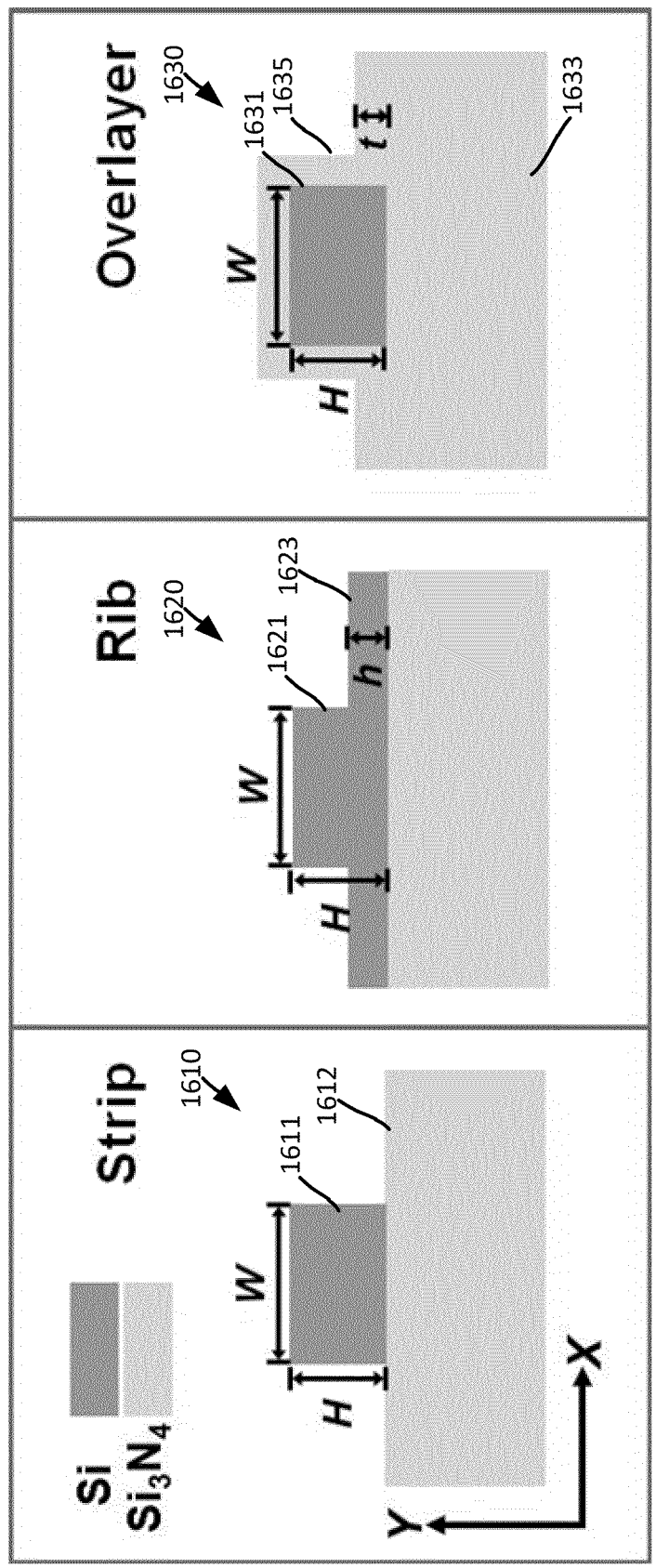
*Fig. 16A*  *Fig. 16B*  *Fig. 16C*

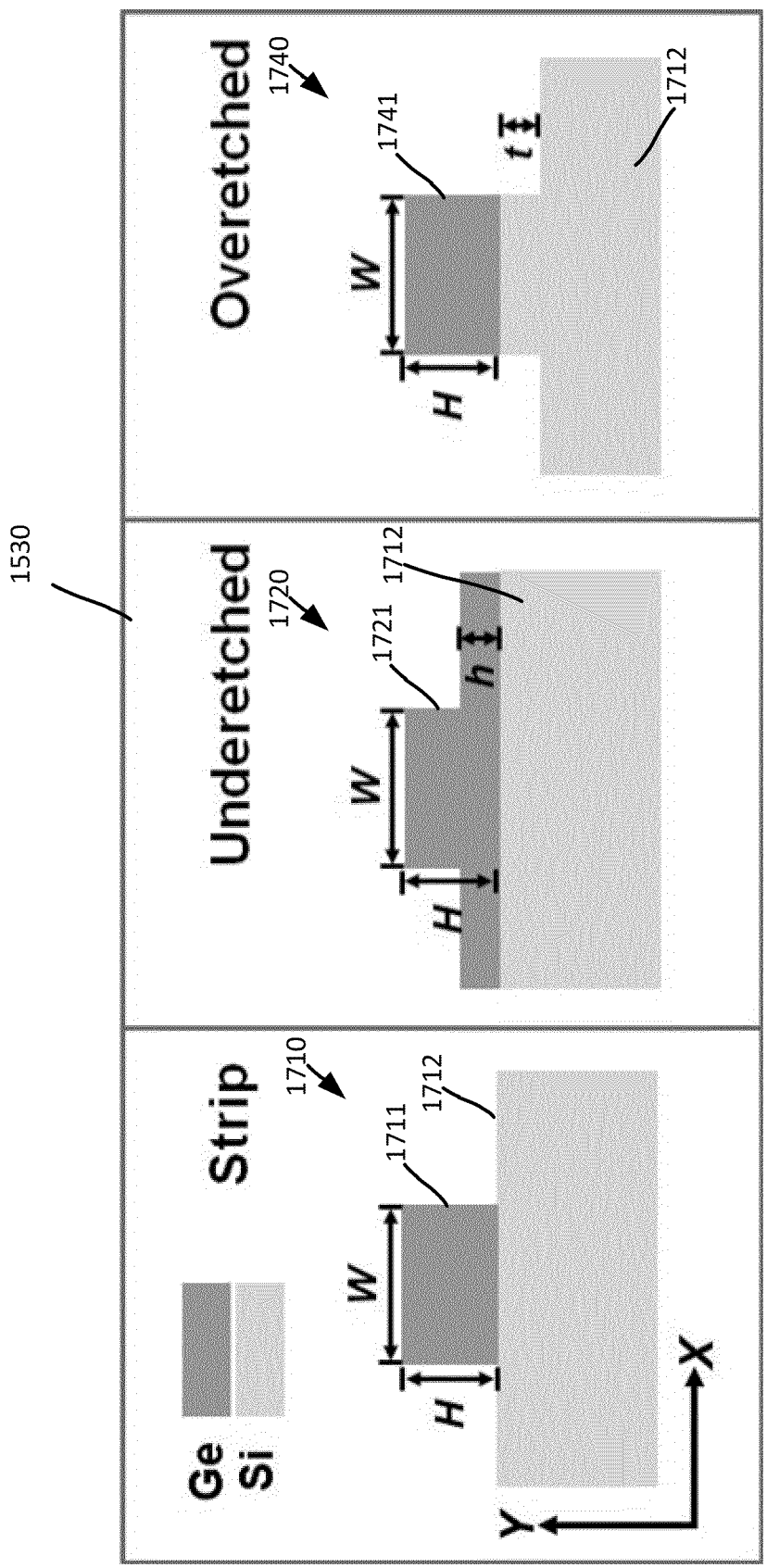
*Fig. 17A*  *Fig. 17B*  *Fig. 17C*

WAVEGUIDE-BASED DISPERSION DEVICE

CROSS REFERENCE TO RELATED APPLICATIONS

This application claims priority to U.S. provisional application 61/301,518 filed Feb. 4, 2010. The disclosure of the prior application is considered part of and is incorporated by reference in the disclosure of this application.

FEDERALLY SPONSORED RESEARCH OR DEVELOPMENT

This invention was made with government support under Grant No. N66001-08-1-2059 awarded by Defense Advanced Research Projects Agency/Space and Naval War Systems Command (DARPA/SPAWAR). The government has certain rights in the invention.

BACKGROUND

This patent document relates to optical devices that affect dispersion of an electromagnetic signal.

Optical dispersion is a phenomenon observed in various optical materials in which different optical frequency components in an optical pulse travel at different speeds which can lead to an undesired pulse broadening. Chromatic dispersion in optical transmission materials such as optical fiber is known to cause a degrading effect in an optical signal, such as in fiber-optic telecom systems. In a real data stream, the dispersion-induced pulse broadening accumulates over transmission distance and causes overlap between adjacent pulses and thus inter-symbol interference. Chromatic dispersion can limit the maximum reachable distance of optical communication systems. Some dispersion compensators include such as dispersion compensating fiber, fiber Bragg grating, and ring-resonator-based integrated devices.

SUMMARY

This document describes examples and implementations of systems and techniques related to dispersing an electromagnetic signal according to a predefined dispersion profile. For example, a dispersion device can be made to disperse an electromagnetic signal based on optical coupling between a slot waveguide and another waveguide. In some examples, a slot waveguide is coupled with a strip waveguide. Coupling includes, for example, arranging or making the slot waveguide with respect to the strip waveguide so that the electromagnetic signal is propagated through on both the slot waveguide and the strip waveguide resulting in a modal field overlap between a mode in the slot waveguide and a mode in the strip waveguide due to effective indexes of refraction of the slot waveguide and the other waveguide. With such a slot-strip combination, dispersion of up to +/−180000 ps/nm/km can be obtained due to a strong interaction of a slot mode and a strip mode in such a dispersion device. Such slot-based dispersion devices can be structured to produce desired dispersion profiles for various applications, such as for dispersion compensation applications. The electromagnetic signal can include an electromagnetic wave such as light in the visible or non-visible ranges.

In some implementations, a slot-based dispersion device can be made to use an anti-crossing effect for producing positive or negative dispersion. Structural parameters of the dispersion device can be selected to manipulate this anti-crossing effect to tailor a dispersion profile for the dispersion device. For example, a peak value of the dispersion profile, a peak wavelength of the dispersion profile, and a breadth of the dispersion profile can all be tailored by adjusting the structural parameters of the dispersion device. Also, a flat and relatively large dispersion profile (e.g., −31300 ps/nm/km dispersion over 147-nm bandwidth with <1% variance) can be achieved by cascading one or more structural parameters of a slot-based dispersion device across multiple sections, such as by varying a waveguide thickness or dispersion device width.

The high dispersions achieved by such dispersion devices can be applied to dispersion compensation for fiber transmission systems as well as to on-chip integrated signal processing functions, such as optical delay, correlation, and signal buffer. Also, the techniques and devices based on slot waveguides in this document can be applied to various types of slot waveguides and waveguide configurations. Dispersion devices described herein can be integrated in optical fiber communication systems, such as with fiber ring resonators and other optical devices. The present slot-waveguide based dispersion devices can be structured to be compatible with existing material systems in integrated optics, such as III-V compound semiconductors (e.g., InP, GaAs, InGaAsP), silicon-based materials (e.g., silicon-on-insulator, silicon nitride), silica-on-silicon, artificial photonic crystals (e.g., air-hole-based or rod-based), and polymers (e.g., SU8).

DESCRIPTION OF THE DRAWINGS

FIGS. 3A-3C show an example of a cross-sectional view of a dispersion device at different wavelengths.

FIGS. 9A-9B show examples of dispersion devices.

FIGS. 10A-10B show an example of a dispersion device.

FIG. 15 shows an example system including a dispersion compensator.

FIGS. 16A-16C show examples of waveguides that can be coupled with a slot waveguide.

FIGS. 17A-17C show examples of waveguides that can be coupled with a slot waveguide.

DETAILED DESCRIPTION

Figure 1A:
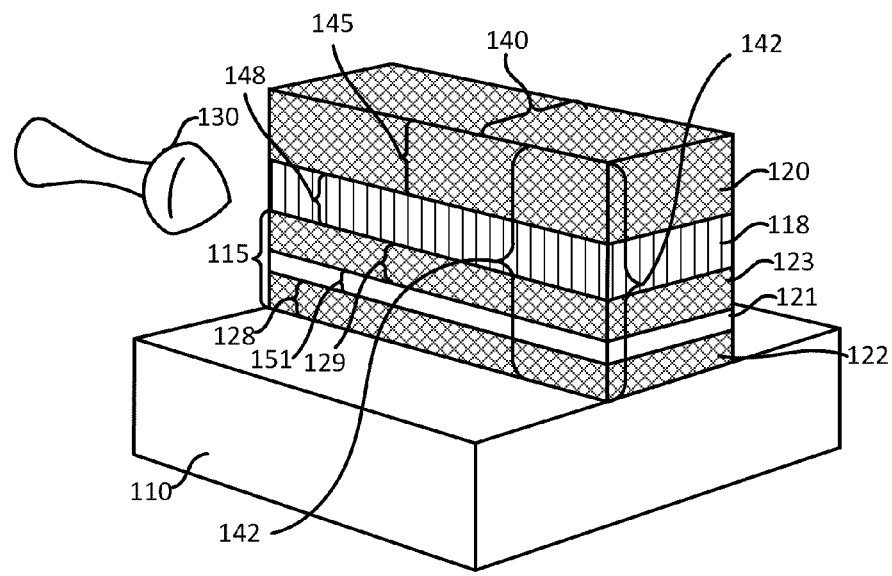
FIGS. 1A-1B show an example of a dispersion device.

FIG. 1A shows an example of a dispersion device 100. The dispersion device 100 includes a slot waveguide 115 coupled with a strip waveguide 120 separated by a spacing layer 118. The slot waveguide 115 includes a nanoscale layer—a slot 121—that is located between two layers, first layer 122 and second layer 123. The slot has a lower index of refraction that the first layer 122 and the second layer 123. The slot 121 has a dimension of less than one wavelength of an electromagnetic signal 130 guided along a direction parallel to the waveguide direction—i.e., the direction along which the electromagnetic signal is propagated along the waveguide. The slot waveguide 115 is designed to provide optical confinement in the slot 121. Optical confinement in the slot 121 can be up to 30-50% of an optical field of the electromagnetic signal 130. In some examples, the slot waveguide 115 is fabricated on a substrate 110, which can be made of materials having a low index of refraction for the slot 121 and materials having a high index of refraction for the first layer 122 and the second layer 123. In the example shown, the slot waveguide 115 is fabricated on the substrate 110 and vertically coupled with the strip waveguide 120.

The strip waveguide 120 is a strip of guiding material having a high index of refraction relative to surrounding material. In the example shown, the strip waveguide 120 is surrounded by the spacing layer 118 and surrounding atmosphere, each of which has an index of refraction lower than the strip waveguide 120.

The strip waveguide 120 is made of silicon. The strip can also be made of materials such as III-V compound semiconductors (e.g., InP, GaAs, InGaAsP, GaP, GaN, GaSb, InSb, InAs), silicon-based materials (e.g., silicon-on-insulator, silicon nitride), silica-on-silicon, artificial photonic crystals (e.g., air-hole-based or rod-based), and polymers (e.g., SU8). In some examples, the strip can be made of sapphire, germanium, or of sputtered films, including Ag, Al, Al-1% Si, Al2O3, Au, Co-80% Cr, Cr, Cu, Fe, Ge, Mo, Nb, Ni, Ni-20% Cr, Ni-7% V, Pt, Si, SiC, $Si_3N_4$, SiO2, Ta, TaN, $TaSi_2$, Ta5Si3, Ti, TiN, TiO2, Ti-90% W, W, WN, $WSi_2$. The slot is made of silicon dioxide. The slot can also be made of III-V compound semiconductors (e.g., InP, GaAs, InGaAsP, GaP, GaN, GaSb, InSb, InAs), silicon-based materials (e.g., silicon-on-insulator, silicon nitride). The spacing layer is made of silica. The spacing layer can also be made of air, and/or polymer. The first layer 122 and the second layer 123 is made of silicon. The first layer 122 and the second layer 123 can also be made of materials such as III-V compound semiconductors (e.g., InP, GaAs, InGaAsP, GaP, GaN, GaSb, InSb, InAs), silicon-based materials (e.g., silicon-on-insulator, silicon nitride), silica-on-silicon, artificial photonic crystals (e.g., air-hole-based or rod-based), and polymers (e.g., SU8). In some examples, The first layer 122 and the second layer 123 can also be made of sapphire, germanium, or of sputtered films, including Ag, Al, Al-1% Si, Al2O3, Au, Co-80% Cr, Cr, Cu, Fe, Ge, Mo, Nb, Ni, Ni-20% Cr, Ni-7% V, Pt, Si, SiC, Si3N4, $SiO_2$, Ta, TaN, TaSi2, Ta5Si3, Ti, TiN, $TiO_2$, Ti-90% W, W, WN, and $WSi_2$. The slot is made of silicon dioxide. The slot can also be made of III-V compound semiconductors (e.g., InP, GaAs, InGaAsP, GaP, GaN, GaSb, InSb, InAs), silicon-based materials (e.g., silicon-on-insulator, silicon nitride). The substrate is made of silicon dioxide. The substrate can also be made of materials such as III-V compound semiconductors (e.g., InP, GaAs, InGaAsP, GaP, GaN, GaSb, InSb, InAs), silicon-based materials (e.g., silicon nitride), Sapphire, Germanium, and polymers (e.g., SU8).

Figure 1B:
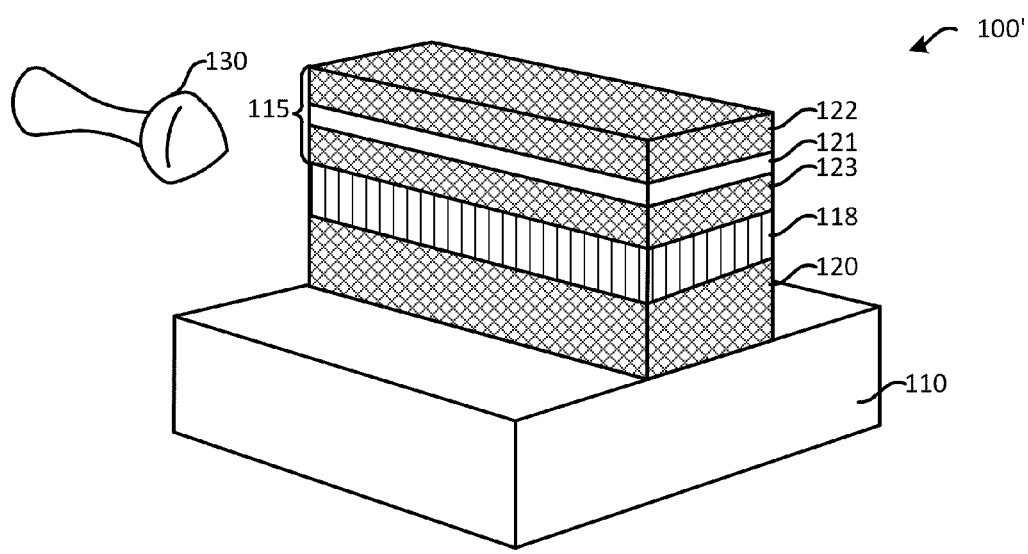

FIG. 1B shows the dispersion device 100' on the substrate 110 rotated 180 degrees such that the strip waveguide is deposited on the substrate 110 and not the slot waveguide 115. The dispersion profile produced by the waveguide as oriented in FIG. 1A is similar to the dispersion profile produced by the dispersion device 100' as oriented in FIG. 1B.

Figure 2B:
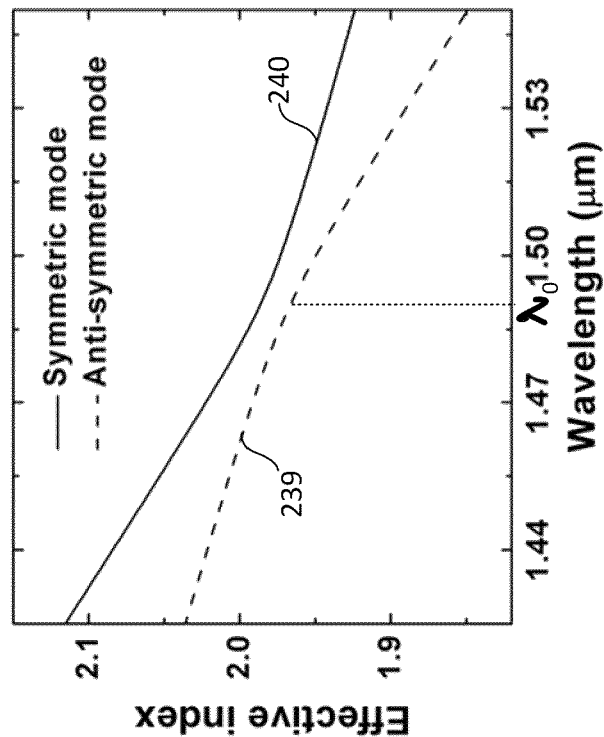
FIGS. 2A-2B show examples of effective indexes of a strip mode and a slot mode.
Figure 2A:
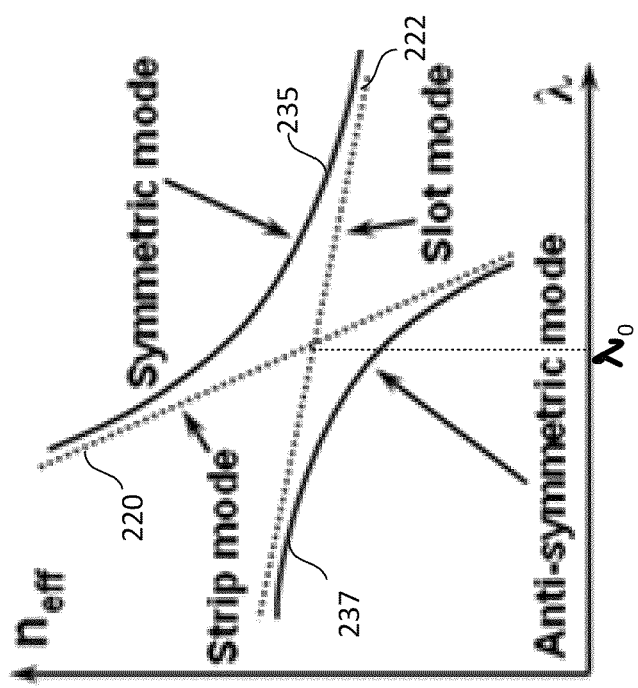

The strip waveguide 120 has an effective index of refraction 220 that is wavelength dependent, and the slot waveguide 115 has an effective index of refraction 222 that is wavelength dependent as conceptually shown by in FIG. 2A. As wavelength increases, the effective index 220 of the strip waveguide 120 and the effective index 222 of the slot waveguide 115 decrease linearly. However, the magnitude of the slope of the effective index 220 and of the effective index 222 differ. The slope of the effective index 220 of the strip waveguide 120 decreases faster with increase of wavelength than does the slope of the effective index 222. As a result, the effective index 220 of the strip waveguide 120 and the effective index 222 of the slot waveguide 115 have a crossing point at a particular wavelength $\Sigma_o$.

The dispersion device 100 has a first effective index of refraction 235 when the mode of the signal 130 that passes through the strip waveguide 120 and the mode of the signal 130 that passes through the slot waveguide 115 are in phase (i.e., in the symmetric mode). When the modes of the signal 130 that pass through the slot waveguide 115 and the strip waveguide 120 are out of phase (i.e., in the anti-symmetric mode), the dispersion device 100 has a second effective index of refraction 237. These in-phase and out-of-phase modes of the dispersion device 100 depend on launching conditions of the dispersion device 100. Different launching conditions (input field mode area, intensity and phase distribution, the alignment of the input field and waveguide) can excite different modes.

FIGS. 3A-3C show an example of cross-sectional views of the dispersion device 100 at different wavelengths. Shorter wavelengths (i.e., shorter than the wavelength $\Sigma_o$ at the crossing point) of the signal 130 primarily pass through the strip guide 120 as shown in FIG. 3A. Longer wavelengths (i.e., longer than the wavelength $\Sigma_o$ at the crossing point) of the signal 130 primarily pass through the slot waveguide 115 as shown in FIG. 3C. Wavelengths of the signal 130 at and around the wavelength $\Sigma_o$ at the crossing point pass through both the strip waveguide 120 and the slot waveguide 115 as shown in FIG. 3B. At the crossing point $\Sigma_o$, strong light coupling occurs between the slot waveguide 115 and the strip waveguide 120 due to index-matching at the wavelength $\Sigma_o$ at the crossing point. At the crossing point, the optical mode supported by the coupled waveguides in the dispersion device experience a sharp transition of mode shape and thus a relatively large dispersion. For the symmetric mode, the dispersion is a negative dispersion. For the anti-symmetric mode, the dispersion is a positive dispersion.

The dispersion device 100 has various structural parameters that can be adjusted to tailor a dispersion profile for an electromagnetic signal 130 propagated through the waveguide 100. For example, structural parameters can be determined for the dispersion device 100 to correspond to, for example, a peak dispersion value and/or a peak wavelength of a predetermined dispersion profile. The dispersion device can then be made with the determined parameters so that a signal that is guided through the dispersion device will be dispersed according to the predetermined dispersion profile. Example parameters include a width 140 and a height 142 of the dispersion device as shown in FIG. 1. In the example in FIG. 1, the width 140 and height 142 are uniform across the dispersion device. Other example parameters include: a thickness 145 of the strip waveguide 120; a thickness 148 of the spacing layer 118, a thickness 151 of the slot 121, a thickness 128 of the first layer 122, and a thickness 129 of the second layer 123. Other parameters that can be selected include indices of refraction of the various materials in the dispersion device, widths of the slot waveguide and/or the other waveguide, selection of material for the various parts of the dispersion device 100.

In some implementations, the dispersion device 100 in FIG. 1, includes the following structural parameters: the dispersion device width 140 is 500 nm, the strip waveguide thickness 145 is 255 nm, the spacing layer thickness 148 is 500 nm, the slot thickness 151 is 40 nm, and the first layer 122 and second layer 123 thicknesses 128 and 129 are each 160 nm. The slot 121 is a low-index layer of silica. The layers 122 and 123 are silicon layers. The strip waveguide 120 is made of silicon. The slot waveguide has a different mode confinement than the strip waveguide, which induces a sharp transition from short wavelength to long wavelength.

Figure 4:
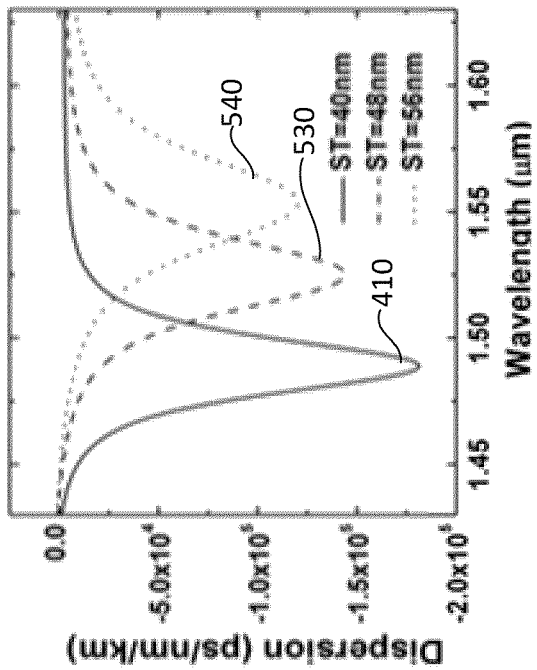
FIG. 4 shows an example of dispersion profiles.

FIG. 2B shows a graph of effective indexes of the dispersion device 100—effective index 240 for the symmetric mode and effective index 239 for the anti-symmetric mode—as a function of wavelength with the above mentioned structural parameters. The crossing point occurs at 1.489-μm wavelength. FIG. 4 shows an example of dispersion profile 410 for a symmetric mode and a dispersion profile 420 for an anti-symmetric mode for the signal 130 passing through the dispersion device 100 with the above structural parameters. The crossing point occurs at 1.489-μm wavelength, and the symmetric mode has a dispersion of −181520 ps/nm/km at the crossing point, as shown in FIG. 4. The anti-symmetric mode has the same amount of positive dispersion at the crossing point at 1.489-μm wavelength. With such dispersion, one-meter of the dispersion device 100 with the above structural parameters can achieve dispersion that is equivalent to the dispersion given by an approximately 10-km-long single mode fiber. By coupling a slot waveguide and strip waveguide in a dispersion device this manner, significant dispersion can be realized over a relatively short distance. In some examples, such dispersion can be used to compensate for chromatic dispersion that results from passing a signal along a long length of optical fiber.

FIGS. 5A-5H show examples of relationships between structural parameters of the dispersion device 100 and a dispersion profile produced by the dispersion device 100. By changing a structural parameter of the dispersion device 100, the dispersion profile produced by the dispersion device 100 will also change. Structural parameters for the dispersion device 100 can be selected according to the following structural parameter-dispersion profile relationships to produce a predetermined dispersion profile. Once the structural parameters have been selected, a dispersion device can be made according to those selected parameters to produce the predetermined dispersion profile.

Figure 5A:
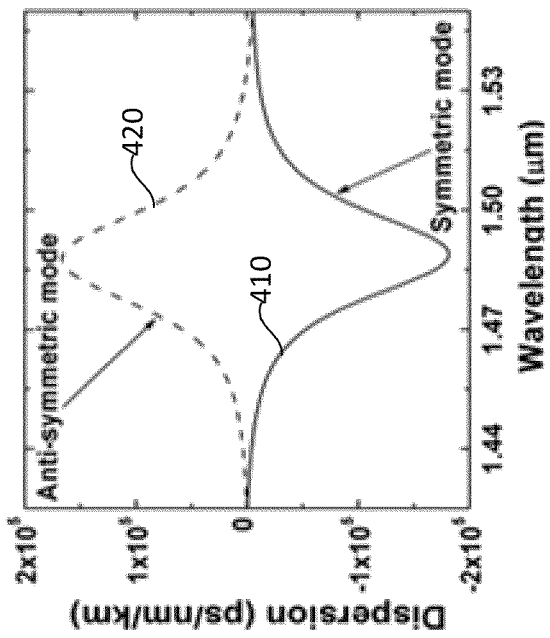
FIGS. 5A-5H show examples of relationships between structural parameters of a dispersion device and a dispersion profile.

For example, an incremental increase in slot thickness shifts a dispersion profile produced by the dispersion device 100 towards a longer wavelength, and the magnitude of the dispersion peak decreases. FIG. 5A shows example dispersion profiles produced by the dispersion device 100 with varying slot thicknesses 151 ("ST"). Except for the slot thickness 151, the structural parameters of the dispersion device 100 are the same as those discussed above in connection with FIG. 4. FIG. 5A shows the dispersion profile 410 for a slot thickness 151 of 40 nm as shown in FIG. 4. FIG. 5A also shows a dispersion profile 530 produced by the dispersion device 100 with a slot thickness 151 of 48 nm and a dispersion profile 540 produced by the dispersion device 100 with a slot thickness 151 of 56 nm.

Figure 5C:
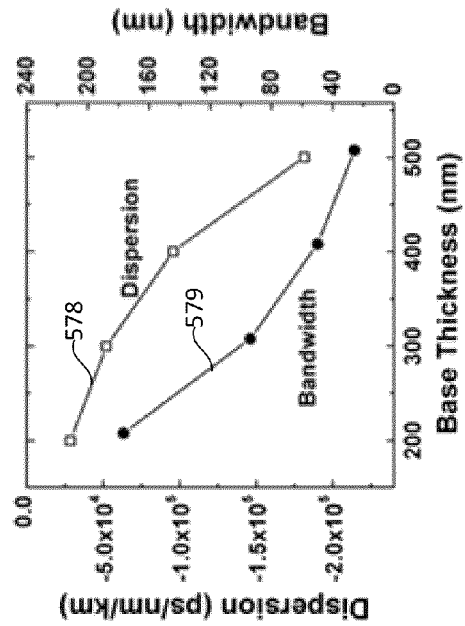
Figure 5B:
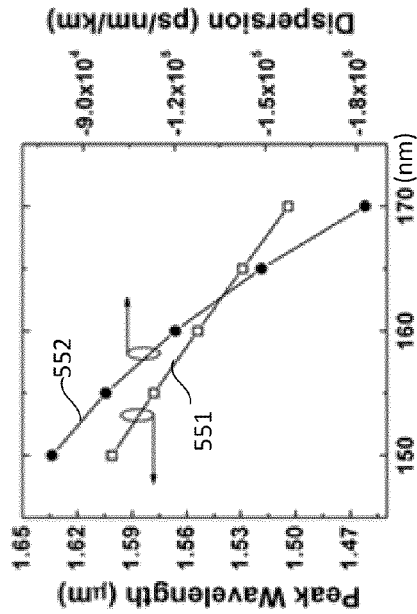

FIG. 5B shows a graphed representation 586 of how shifting the slot thickness 151 from 40 nm to 60 nm results in a shift in the dispersion peak wavelength by almost 77 nm. FIG. 5B also shows a graphed representation 585 of how shifting the slot thickness from 40 to 60 nm results in a decrease in the magnitude (i.e., absolute value) of the dispersion peak value by about 38%. These shifts can be attributed to the fact that, as the slot thickness 151 increases, the effective index of the slot mode decreases, the crossing point red-shifts, and the effective indices over wavelength of the slot waveguide 115 and the strip waveguide 120 guided have closer slopes.

In some examples, adjusting thickness 128 and 129 of the layers 122 and 123 in the slot waveguide 115 can also modify dispersion properties of the dispersion device. FIG. 5C shows for a slot thickness of 56 nm, how shifting the layer thicknesses 128 and 129 from 150 nm to 170 nm (1) blue-shifts the dispersion peak wavelength (i.e., the wavelength at the crossing point) by about 103 nm from approximately 1605 nm to 1502 nm as shown by representation 551, and (2) increases the magnitude of the dispersion peak value (i.e., makes dispersion more negative, from −79683 to −182800 ps/nm/km) as shown by graphed representation 552. Also, as the layer thicknesses 128 and 129 increase, the dispersion profile becomes wider.

Figure 5E:
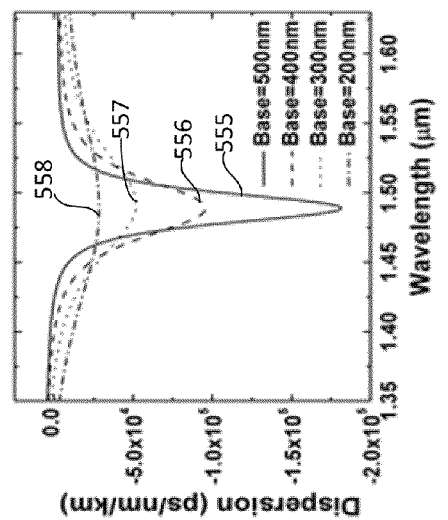
Figure 5D:
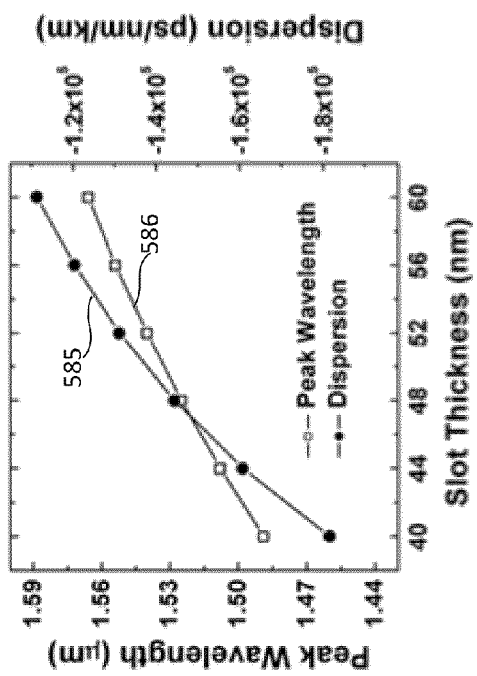

A dispersion profile produced by the dispersion device 100 can be tailored with relatively finer tuning by adjusting the slot thickness 151 and/or the layer thicknesses 128 and 129, because, for example, such changes can provide relatively small modifications to the peak value of dispersion at the crossing point. In some examples, courser tuning of the peak value of the dispersion profile can be realized by adjusting the spacing layer thickness 148. For example, increasing the spacing layer thickness 148 increases the magnitude of the dispersion value at the peak (i.e., the absolute value of the amount of dispersion) while producing very little change to the dispersion peak wavelength (i.e., the wavelength at the crossing point). As the spacing layer thickness 148 decreases, effective indices of the slot waveguide 115 and the strip waveguide 120 increase, causing a small shift of the peak wavelength. The strip thickness 145 can be changed to balance this small shift in the peak wavelength. FIG. 5D shows that the magnitude of dispersion decreases greatly from −181520 to −28473 ps/nm/km, as the spacing layer thickness 148 varies from 500 to 200 nm. FIG. 5D shows four profiles, 555, 556, 557, and 558 that each has a lower peak value that the previous as the spacing layer thickness (referred to as "base" in the figure) decreases from 500, to 400, 300, and 200 nm, respectively. To keep the same peak wavelength, strip waveguide thickness 145 can be changed to 255 nm, 255.5 nm, 257 nm and 259 nm for the spacing layer thickness 148 of 500, 400, 300 and 200 nm, respectively.

By adjusting the spacing layer thickness 148, there is a trade-off between peak dispersion and dispersion profile's full width at half maximum (FWHM). As shown in FIG. 5E, when the spacing layer thickness 148 increases from 200 nm to 500 nm the dispersion profile's FWHM drops from 177 to 26 nm as shown by graphed representation 579 and the magnitude of the dispersion peak value decreases as shown by graphed representation 578.

Figure 5G:
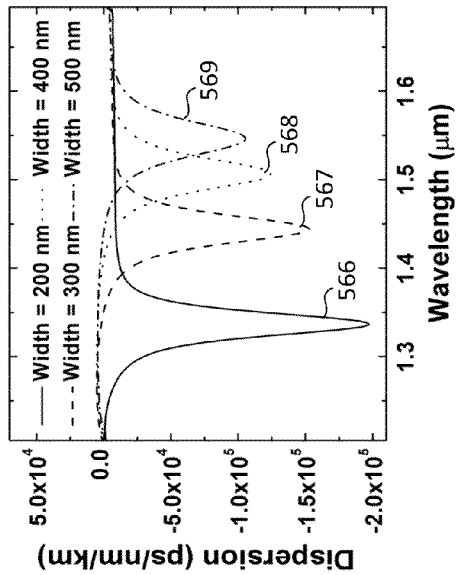
Figure 5F:
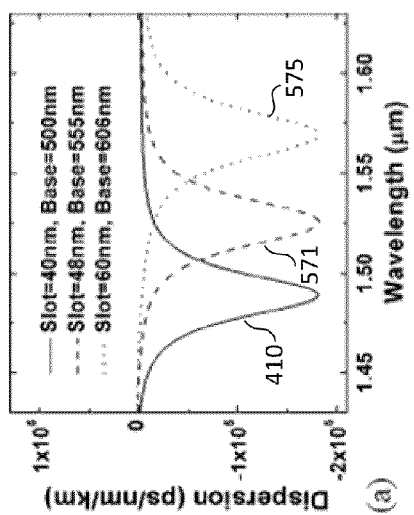

In some examples, a dispersion profile can be shifted without changing its peak value and bandwidth by adjusting two or more of structural parameters of the dispersion device 100. For example, by increasing both the slot thickness 151 and the spacing layer thickness 148, a peak wavelength of a dispersion profile can be adjusted without otherwise substantively changing the dispersion profile. Increasing the slot thickness 151 red-shifts the dispersion profile and reduces its peak value, while increasing the spacing layer thickness 148 increases the peak value while only slightly changing peak wavelength. FIG. 5F shows the dispersion profile 410 (i.e., with a slot thickness 151 of 40-nm, a 500-nm spacing layer thickness 118, and a maximum dispersion values of −181520 ps/nm/km). FIG. 5F also shows a dispersion profile 571 and a dispersion profile 575 having approximately the same properties as dispersion profile 410 except that their respective peak wavelengths have increased by 37 and 77 nm respectively (i.e., they have shifted to the right). To achieve such a shift, the structural parameters of the dispersion device 100 were changed as follows: (1) for the dispersion profile 571, the slot thickness 151 was changed to 48 nm and the spacing layer thickness 118 was changed to 555 nm, and (2) for the dispersion profile 575, the slot thickness 151 was changed to 60 nm and the spacing layer thickness 118 was changed to 606 nm. The resulting maximum dispersion values for dispersion profiles 410, 571, and 575 are −181520, −182585, and −182028 ps/nm/km, respectively.

Also, changing the dispersion device width 140 affects the dispersion profile produced by the dispersion device 100. FIG. 5G shows a dispersion profile 566 at dispersion device width 140 of 200 nm. As the dispersion device width 140 increases, the magnitude of the peak value decreases (i.e., becomes less negative) and the wavelength of the peak also increases as shown by profile 567 at 300 nm, profile 568 at 400 nm, and profile 569 at 500 nm. The dispersion profile produced by the dispersion device 100 is less sensitive to change in the dispersion device width 140 as compared to changing the vertical dimensions as discussed above, since horizontal light confinement for the y-polarization state is not as tight as in the vertical direction for the 500-nm width.

Figure 5H:
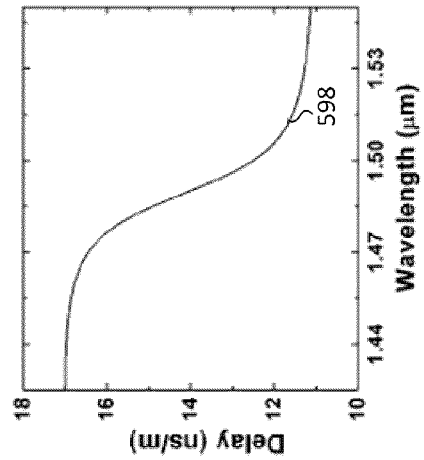

Also, delay across wavelengths can be tuned by adjusting structural parameters of the dispersion device 100. FIG. 5H shows a delay profile 598 produced by the dispersion device 100 with the structural parameters discussed above in connection with FIG. 4. A tunable delay of up to 7 ns/m can be achieved by converting optical wavelength over ~70 nm.

Various slot-waveguide-based dispersion devices can be used to tailor dispersion profiles using various orientations of slot waveguides and other waveguides. For example, FIG. 9A shows a cross-sectional view of a dispersion device 900 having a slot waveguide 915 deposited on a surface 909 of substrate 910 and a strip waveguide 920 deposited on the surface 909 of the substrate 910. The slot waveguide 915 includes a slot 921 that is clad by layers 922 and 923. The slot 921 and the layers 922 and 923 are parallel to the surface of the substrate 910. The strip waveguide has an index of refraction greater that the substrate 910 and a surrounding environment 950. The low-index environment 950 surrounds the strip waveguide 920 and can include for example, air, silica, and/or polymer. The strip waveguide 920 is horizontally coupled with the slot waveguide 915. In other words, the strip waveguide 920 is deposited on the surface 909 horizontally from the strip waveguide 920 which is also deposited on the surface 909. The dispersion device 900 has a spacing layer 918 consisting of the environment 950 in the space between the strip waveguide 921 and the slot waveguide 915. Various structural parameters of the dispersion device 900 can be selected to tailor a dispersion profile for a signal to be passed through the dispersion device. The dispersion profile has a peak dispersion at a crossing point wavelength corresponding to a crossing point of effective indices of refraction of the slot waveguide 915 and the strip waveguide 920.

Achieving high dispersion can be achieved no matter which waveguide is placed on the left. Also, in another example, FIG. 9B shows the dispersion device 900' with the slot waveguide 915 rotated about by 90 degrees such that the slot 921 and the layers 922 and 923 are perpendicular to the surface of the substrate 910. For such an orientation, the polarization state of the electromagnetic signal 930 to be propagated through the waveguide 900 should be rotated by 90°.

A dispersion device can also have a slot waveguide with multiple slots coupled with another waveguide vertically or horizontally. For example, FIG. 10A shows an example of a dispersion device 1000 with a strip waveguide 1020 deposited on a substrate 1010 and horizontally coupled with a slot waveguide 1015. The slot waveguide 1015 has three slots, 1031, 1032, 1033 parallel to the surface 1009 of the substrate 1010 with layers 1022 and 1023. The slots 1031, 1032, and 1033 are spaced with spacers 1034 and 1035. Structural parameters of the dispersion device 1000 can be selected to tailor a dispersion profile produced by the dispersion device 1000. FIG. 10B shows the dispersion device 1000' with the slot waveguide 1015 rotated by 90 degrees such that the slots 1031, 1032, and 1033 are perpendicular to the surface 1009 of the substrate 1010.

In some implementations, a dispersion device can include a slot waveguide coupled with other types of waveguides such a ridge waveguide to produce dispersion at a crossing point. FIGS. 16A-16C shows examples of waveguides that can be coupled with a slot waveguide. FIG. 16A shows a strip waveguide 1610 that includes a silicon strip 1611 with a predetermined height (H) and width (W) formed on a low-index layer 1612 (e.g., $Si_3N_4$). FIG. 16B shows a rib waveguide 1620 that includes a silicon layer 1621 with a first height (h) and a second height (H) that is greater than the first height (h). The portion of the silicon layer 1621 with the second height (H) also has a predetermined width (W). The silicon layer 1621 is formed on a layer 1623 that can be either the same material as 1621 (i.e., silicon) or a material with a lower index of refraction (e.g., $Si_3N_4$). FIG. 16C shows an overlayer waveguide 1630 that has a silicon layer 1631 with a width (W) and height (H) on layer 1633 (e.g., a $Si_3N_4$) and that is overlayed with additional layer 1635 (e.g., $Si_3N_4$) that has a thickness (t).

FIGS. 17A-17C show examples of waveguides that can be coupled with a slot waveguide. FIG. 17A shows a strip waveguide having the same layout as in FIG. 16A except a strip 1710 (compared to 1610) that is made of Germanium is formed on a silicon layer 1712. The strip 1710 can be made by forming Germanium on the silicon layer 1712 and etching the Germanium until a strip 1711 is formed with a height (H) and a width (W). In some examples the Germanium formed on the silicon layer 1712 can be underetched to form a rib waveguide 1720 as shown in FIG. 17B. The rib waveguide 1720 is the same layout as that in FIG. 16B except that underetched layer 1721 is made of Germanium and deposited on the silicon layer 1712. In some examples the Germanium formed on the silicon layer 1712 can be overetched to form a waveguide 1740 as shown in FIG. 17C. The waveguide 1740 has the same layout as that in FIG. 17A except that the Germanium is etched to from strip layer 1741 but is overetched into the silicon layer 1712 by a thickness (t). In this example, layer 1712 is made of silicon. Other materials can be used such as materials as described above for the spacing layer 118 or the substrate 110 in FIG. 1. For the strip 1710, other materials can be used such as those described in connection with strip waveguide 120 in FIG. 1.

In some examples, a dispersion device can include a first slot waveguide with one or more slots coupled with second slot waveguide with one or more slots. The indices of refraction of the materials that make up the slot waveguides, such as the slots, and/or the structural parameters of the two slot waveguides, can be selected so that the first slot waveguide has an effective index of refraction different from an effective index of refraction of the second slot waveguide. The effective index of refraction of the first slot waveguide can have a crossing point with the effective index of refraction of the second slot waveguide. A dispersion profile can be obtained from such dispersion device with a dispersion peak at the crossing point.

Figure 6:
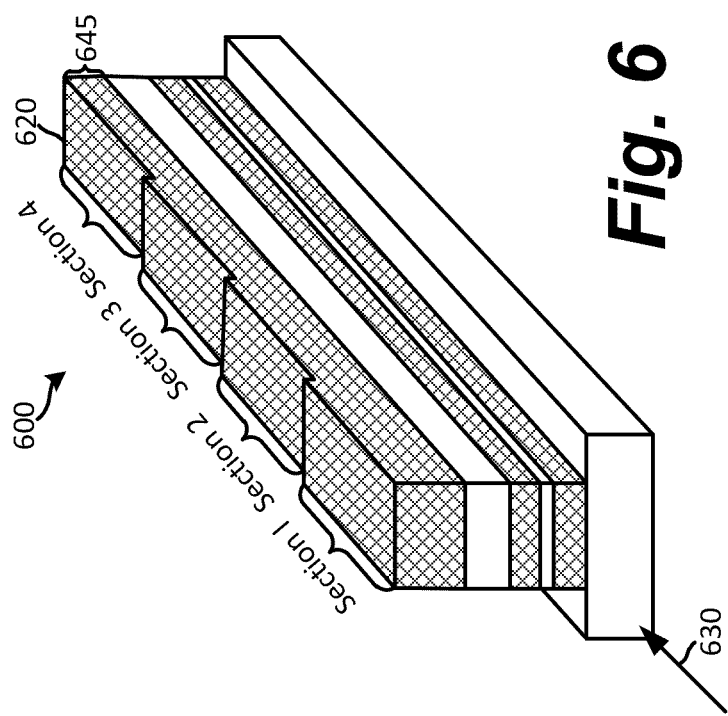
FIG. 6 shows an example of a dispersion device.

In some implementations, a broadband (e.g., flattened) dispersion profile can be obtained by modifying one or more structural parameters of a dispersion device across a dimension of a dispersion device such across a direction of the dispersion device (i.e., the direction along which an electromagnetic signal is propagated). In some examples, one or more structural parameters can vary (i.e., be cascaded) section by section across a dimension of the dispersion device. Each cascaded section can produce a shifted dispersion profile. For example, FIG. 6 shows a dispersion device 600 that is similar to dispersion device 100 except that a thickness 645 of a strip waveguide 620 of the dispersion device 600 is cascaded in four sections—section 1, section 2, section 3, and section 4,—along a direction of the dispersion device parallel to a direction of propagation of a signal 630 through the dispersion device 600. The cascading thickness can be made by depositing layers of strip waveguide material (e.g., silicon) at varying lengths on, for example, strip waveguide 120 on dispersion device 100.

Figure 7:
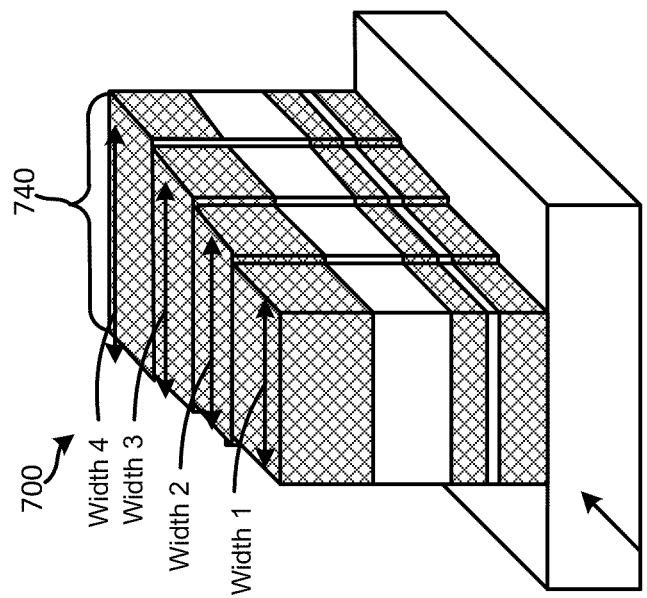
FIG. 7 shows an example of a dispersion device.

A broadband profile can also be obtained by varying other structural parameters. For example, a width of a dispersion device can be cascaded and tapered in multiple sections. As an example, FIG. 7 shows a dispersion device 700 with a width 740 cascaded in four sections, each having a different width—$W_1$, $W_2$, $W_3$, and $W_4$.

A length of each cascaded section of a dispersion device can be calculated by solving the following linear equations:

$$\begin{bmatrix} D_1(\lambda_1) & D_2(\lambda_1) & \ldots & D_n(\lambda_1) \\ D_1(\lambda_2) & D_2(\lambda_2) & \ldots & D_n(\lambda_2) \\ \vdots & \vdots & \ddots & \vdots \\ D_1(\lambda_n) & D_2(\lambda_n) & \ldots & D_n(\lambda_n) \end{bmatrix} \cdot \begin{bmatrix} c_1 \\ c_2 \\ \vdots \\ c_n \end{bmatrix} = \begin{bmatrix} D_0 \\ D_0 \\ \vdots \\ D_0 \end{bmatrix}$$

where $D_i(\lambda)$ (i=1, 2, ..., n) is the dispersion profile of the ith waveguide section; $D_0$ is the desired dispersion value after flattening. Length coefficients $c_1, c_2, \ldots,$ and $c_n$ are solved to determine the length ratio of each modified section to the total waveguide. This forms a dispersion profile with n dispersion values clamped to $D_0$ at wavelengths $\lambda_1, \lambda_2, \ldots,$ and $\lambda_n$.

Figure 8A:
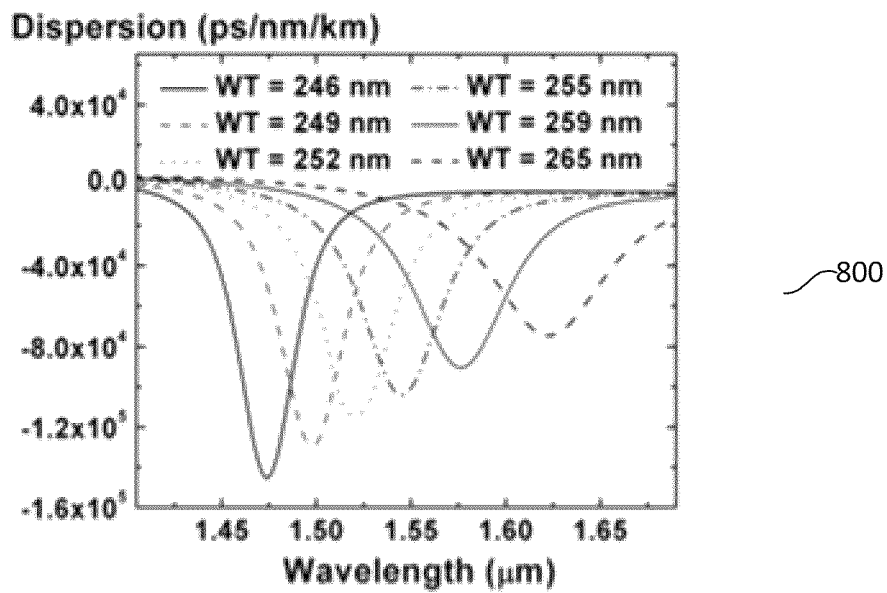
FIGS. 8A-8B show graphs of related dispersion profiles.

FIG. 8A shows an example graph 800 of a profile produced by a dispersion device similar to dispersion device 600 but with six sections instead of four. The dispersion device used in FIG. 8A has the following structural parameters: a dispersion device width of 500 nm, a slot with a thickness of 40 nm, the slot clad by two 150-nm-thick silicon layers, and a spacing layer with a thickness of 500 nm. FIG. 8A shows the shifted dispersion profiles when strip waveguide thickness of the six sections are 246, 249, 252, 255, 259, and 265 nm, respectively. To obtain a dispersion profile that is relatively flat, the waveguide thicknesses are selected according to the clamping wavelengths of the above linear equation. The length ratios are 15%, 11%, 12%, 12%, 17% and 33% accordingly. The length ratios are ratios of respective section to a total length of the dispersion device along a direction of the dispersion device.

Figure 8B:
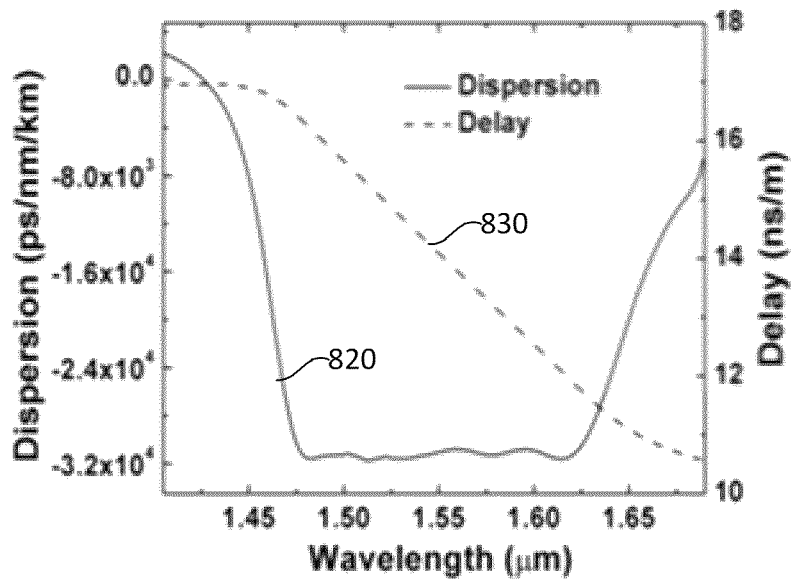

FIG. 8B shows a broadband dispersion profile 820 produced by the dispersion device discussed in connection with FIG. 8A. The dispersion profile 820 has a dispersion of −31300 ps/nm/km over a 147 nm bandwidth, with a variance of 305.5 ps/nm/km, <1% of the mean dispersion. A delay 830 of the dispersion profile of 6.3 ns/m is also shown in FIG. 8B. In some examples, a dispersion device that has been structured to produce a broadband profile, such as dispersion profile 820, can be used to introduce a tunable optical delay for on-chip signal processing by converting wavelengths, such as from 1450 to 1680 nm, as shown in FIG. 8B.

As mentioned above, broadband dispersion can also be obtained by varying the dispersion device width, for example, as shown in FIG. 7. In some examples, a dispersion device can have a cascading width. Such a dispersion device can have a slot, a spacing layer, and a strip waveguide with the following structural parameters: a slot thickness of 40 nm, the slot clad by two 150-nm-thick silicon layers, and a spacing layer thickness of 500 nm, and a strip waveguide thickness of 255 nm. The width is varied across multiple sections from 565 to 500, 445, 390 and 340 nm to obtain a relatively flat dispersion of −46100 ps/nm/km from wavelengths of 1473 to 1564 nm. The length ratios are 26%, 17%, 17%, 7% and 33%, respectively, with a variance is 623 ps/nm/km, <1.4% of the mean dispersion.

Such cascaded slot based dispersion devices, can be included in various systems such as telecom systems, e.g., for achieving multi-channel dispersion compensation or a tunable optical delay. Such dispersion devices can also be fabricated on-chip for signal processing applications.

Figure 11A:
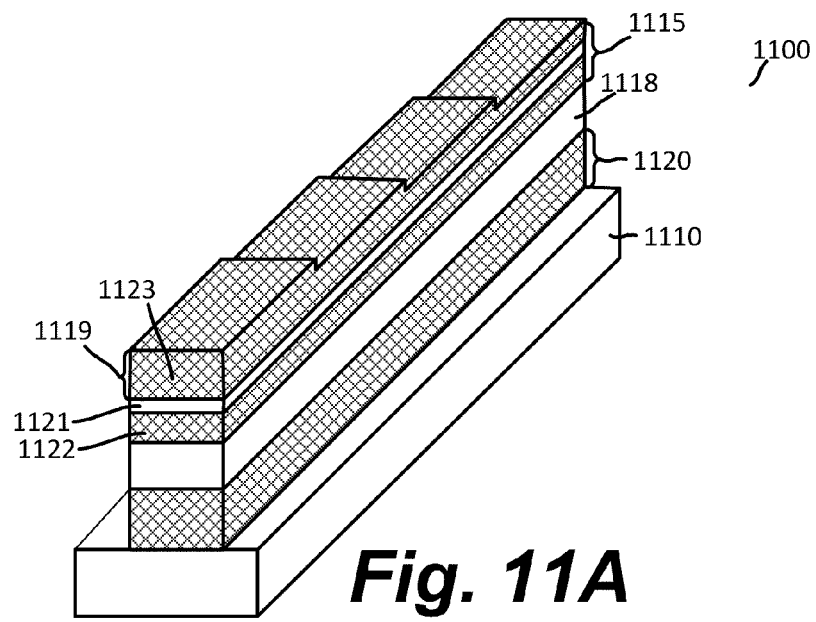
FIGS. 11A-11B show examples of cascaded slot-based dispersion devices.
Figure 11B:
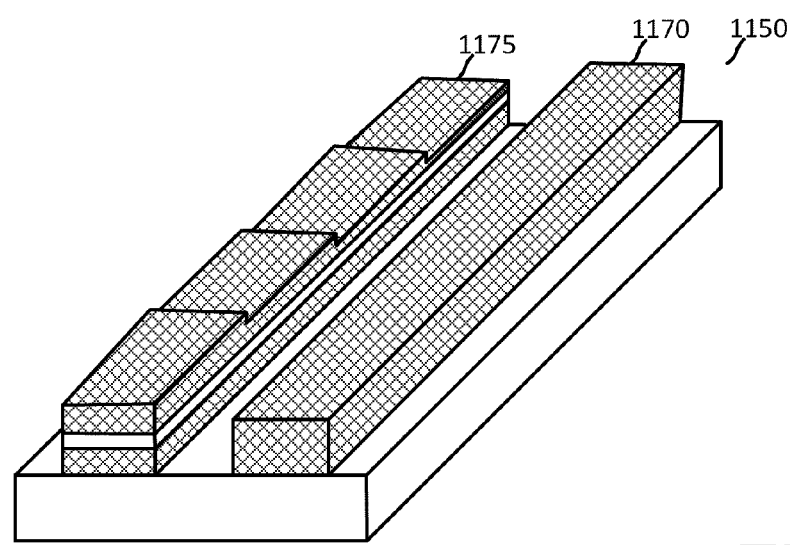
Figure 12:
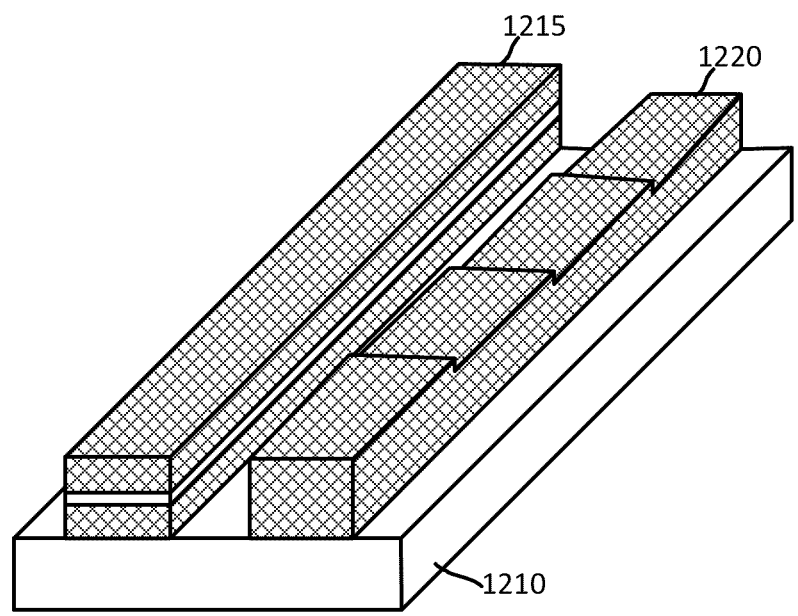
FIG. 12 shows an example of a dispersion device.

FIGS. 11A-11C show examples of cascaded slot-based dispersion devices. Structural parameters of these broadband dispersion devices can be selected to produce tailored broadband dispersion profiles. FIG. 11A, for example, shows a dispersion device 1100 that has a strip waveguide 1120 disposed on a substrate 1110. A spacing layer 1118 is disposed on the strip waveguide 1120. A slot waveguide 1115 is vertically coupled with the strip waveguide 1120. Slot waveguide 1115 has a slot 1121 and a bottom layer 1122 between the slot 1121 and the spacing layer 1118. The slot waveguide also has a top layer 1123 with a thickness 1119 that is cascaded in four sections. FIG. 11B shows a dispersion device 1150 with a strip waveguide 1170 horizontally coupled with a slot waveguide 1175 that is cascaded in four sections. FIG. 12 shows a slot waveguide 1215 disposed on a substrate 1210 and horizontally coupled with a strip waveguide 1220 (also disposed on the substrate 1210) that is cascaded in four sections. The strip waveguide 1220 is also disposed on the substrate 1210.

In some implementations, a dispersion bandwidth can be extended by adding more cascaded sections to a dispersion device. In some examples, more than one structural parameter can be cascaded such as by cascading both a width of a dispersion device and a thickness of a vertical dimension (e.g., a thickness of a strip waveguide) of the dispersion device. In some examples, both a slot waveguide and another waveguide, such as a strip waveguide, can be both cascaded.

In some examples, one or more structural parameters can be tapered across a dimension. The taper can be a linear taper, an exponential taper, or any other taper. For example, a thickness of a strip (or e.g., a slot) layer can be tapered from a first height to a second height. The taper can be linear from the first height to the second height. Also, multiple structural parameters (e.g., width, height, and one or more thicknesses) can simultaneously be varied (e.g., tapered and/or cascaded by section) across a dimension of the dispersion profile. For example, a strip thickness can be cascaded by section (or tapered) while a width of the dispersion device can also be cascaded by section (or tapered). Returning to FIG. 11B, for example, in addition to varying a thickness of a layer on the slot waveguide 1175, a thickness of the strip waveguide 1170 can also be varied so that both the strip waveguide and the slot waveguide are cascaded.

Figure 13A:
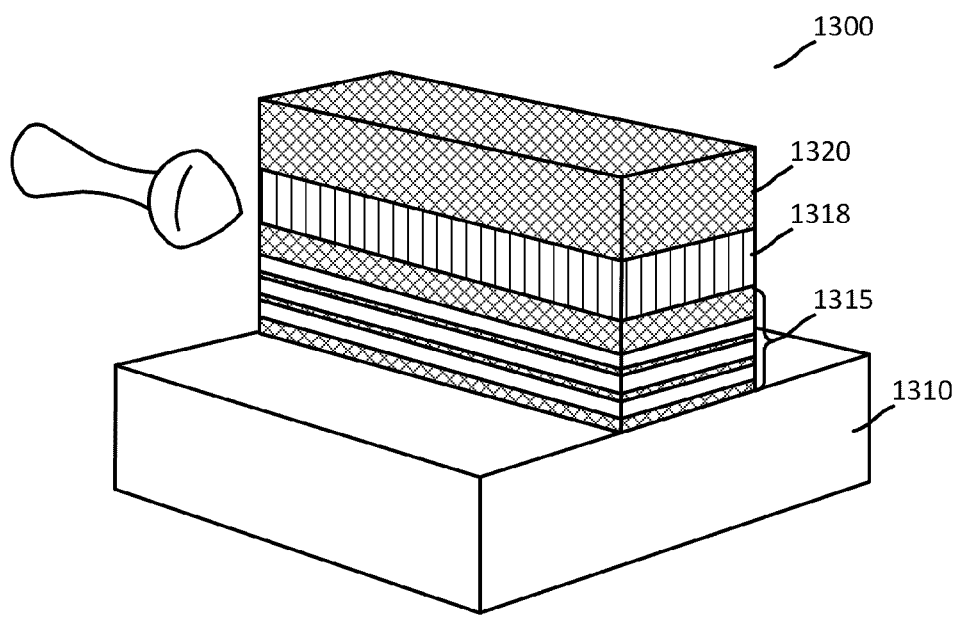
FIG. 13A-13B show an example of a dispersion device.
Figure 13B:
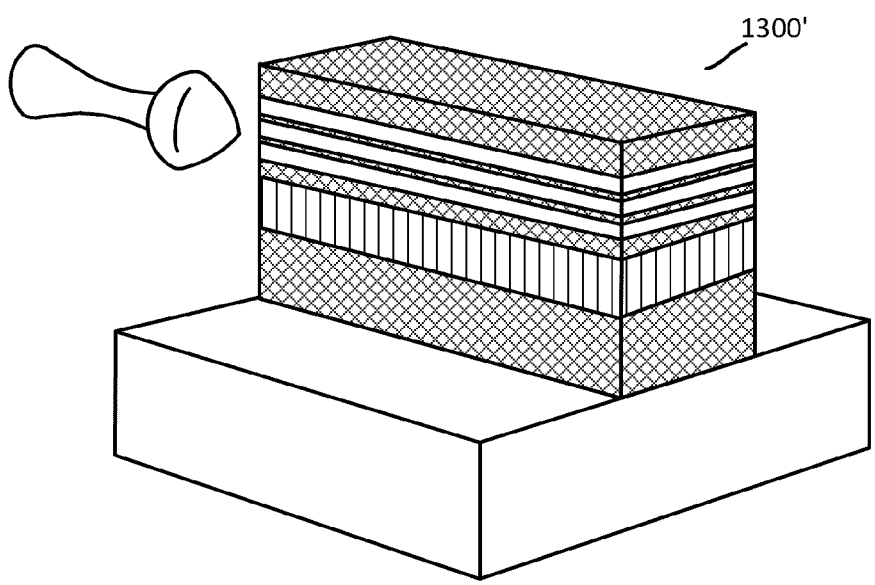

FIG. 13A shows an example of a dispersion device 1300 with a slot waveguide 1315 disposed on a substrate 1310 that is vertically coupled with a strip waveguide 1320. The strip waveguide 1320 and the slot waveguide 1315 are spaced by a spacing layer 1318. FIG. 13B shows the dispersion device 1300' rotated by 180 degrees so that the slot waveguide 1320 is disposed on substrate 1310.

Figure 14:
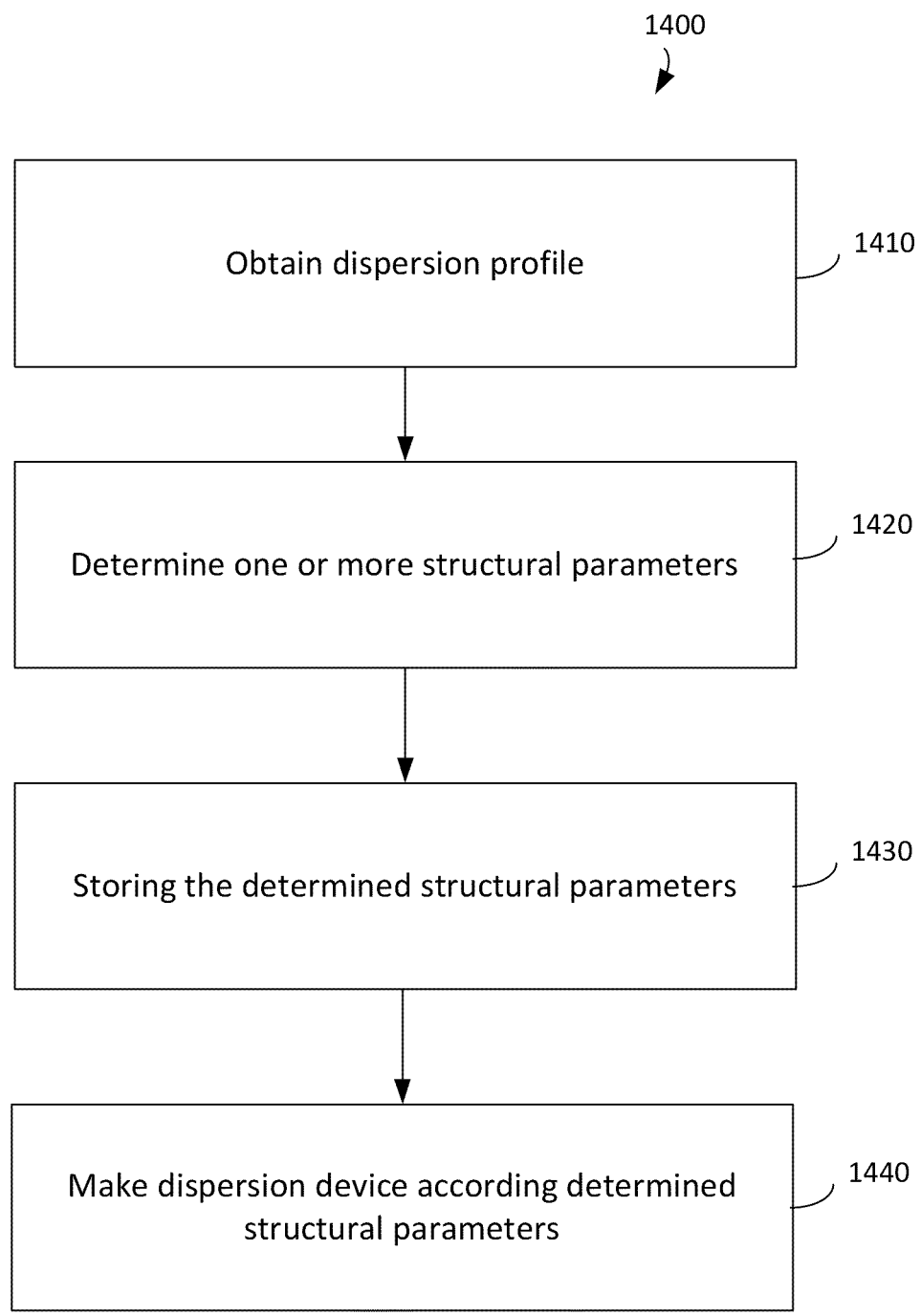
FIG. 14 shows an example of a process for making a dispersion device.

FIG. 14 shows an example of a process 1400 for making a slot-waveguide-based dispersion device that can produce a tailored dispersion profile. At 1410 a dispersion profile is obtained. Obtaining includes receiving the dispersion profile, actively retrieving the dispersion profile, or determining the dispersion profile. The dispersion profile is for a desired dispersion of a signal to be propagated through the dispersion device. The dispersion profile can be obtained for example by receiving from an external source a desired dispersion profile for a dispersion device. In some examples, the obtaining the dispersion profile can include determining the dispersion profile for a particular application. Applications include dispersion compensation such as in a length of optical fiber, on-chip signal processing such as optical delay, correlation, and signal buffer. Other applications include analog-to-digital conversion, RF filtering, equalizer, short pulse real-time oscilloscope, beam steering, and phase array antennas. The dispersion profile can be determined using one or more computing devices programmed to determine a desired dispersion profile for one or more applications.

At 1420, one or more structural parameters of the dispersion device are determined to enable the dispersion device to produce the obtained dispersion profile. The determined one or more structural parameters of the dispersion device can include one or more of: a slot thickness for a slot of a slot waveguide, a spacing thickness between the slot waveguide and the other waveguide, a thickness of a cladding layer of the slot waveguide, a strip waveguide thickness of a strip waveguide in the dispersion device coupled with the slot waveguide, a dispersion device width, a dispersion device height, numbers of slots, orientation of elements on a substrate, and indexes of refractions of these various parts of the dispersion device. Also, one or more of these structural parameters can be cascaded across multiple sections to increase the breadth of a desired dispersion profile.

The one or more structural parameters can be determined according to the relationships between the structural parameters and a dispersion profile, as discussed above. One or more computing devices can be programmed to determine the one or more structural parameters to enable the dispersion device to produce the desired dispersion profile. For example, a computing device can include a machine-readable medium storing instructions to cause a processor to perform operations including determining the one or more structural parameters to enable the dispersion device to produce the desired dispersion profile. In some examples, one or more predetermined structural parameters can be received such as from a remote source over a network. Such predetermined structural parameters can be predetermined for making a dispersion device to produce tailored dispersion of an electromagnetic signal.

At 1430, the determined structural parameters can optionally be stored in a storage device. At 1440, the dispersion device is made according to the determined structural parameters. The dispersion device can be made on a silicon-on-insulator (SOI) platform or other semiconductor manufacture platforms. In some implementations, one or more silicon wafers about 200~500 nm thick can be formed on a first surface of a $SiO_2$ substrate that is approximately 2-Tm thick. On a second, opposite surface of the $SiO_2$ another silicon layer is formed, which is hundreds micrometer thick. On this SOI platform other layers with different materials can be formed to make a dispersion device such as those described above. Plasma-enhanced chemical vapor deposition (PECVD) and low pressure chemical vapor deposition (LPCVD) can be used to deposit different layers onto the SOI platform. Electron beam lithography can be used to etch the structures.

FIG. 15 shows an example system 1500 including a dispersion device 1510. The dispersion device includes a slot waveguide and another waveguide coupled in a manner to cause dispersion with a dispersion profile. The system includes an optical source 1520 that is coupled with the dispersion device 1510. The optical source 1520 provides an electromagnetic signal to the dispersion device 1510. The optical signal is guided along a direction of the dispersion device 1510. The dispersion device 1510 causes dispersion (positive or negative) in the optical signal. The dispersed optical signal is provided to further componentry 1530 for further processing.

In some implementations, the dispersion device 1510 is a dispersion compensator, and the optical source 1520 is an optical fiber. The optical fiber can produce dispersion in an optical signal that is guided through the optical fiber based on its index of refraction. The dispersion device 1510 can have predetermined structural parameters to produce a dispersion profile in the optical signal to compensate for the dispersion produced by the optical fiber. In some examples, the further componentry 1530 can include a processing device to process the optical signal. In some examples, the further componentry 1530 can include further optical fiber so that the dispersion device is in-line with the optical fiber.

In some implementations, the dispersion device 1510 is part of an integrated chip that processes an optical signal from the optical source 1520. In some examples, the optical source 1520 can also be integrated on-chip. For a vertically coupled slot waveguide and strip waveguide, the dispersion device can be made using wafer fabrication. For a horizontally coupled strip and slot waveguides, the strip and slot waveguides can both be formed on a silicon wafer. Integrated chips using a slot-waveguide-based dispersion device can be used in communication systems and other computing systems. For example, a dispersion device with a slot waveguide and another waveguide, such as a strip waveguide, can be formed as part of an integrated chip to provide delay in an electromagnetic signal. The delay determined by the structural parameters of the dispersion device. The structural parameters can be predetermined to obtain a desired delay at a desired wavelength.

Implementations of the subject matter and the operations described in this specification can be implemented in digital electronic circuitry, or in computer software, firmware, or hardware, including the structures disclosed in this specification and their structural equivalents, or in combinations of one or more of them. Example operations that can be implemented in this manner include determining structural parameters of a dispersion device based on a predetermined dispersion profile.

Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), peer-to-peer networks (e.g., ad hoc peer-to-peer networks), wireless networks, mobile phone networks etc.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specifics, these should not be construed as limitations on the scope of an invention that is claimed or of what may be claimed, but rather as descriptions of features specific to particular embodiments. For example, dispersion devices discussed herein include a spacing layer. In some implementations, a dispersion device can have a slot-waveguide that is coupled with another waveguide without a spacing layer. For example, a slot waveguide can have a slot between two layers, and a strip waveguide can be deposited directly on one of the two layers. In some examples, one or both of the two layers can be made of the same material as the strip waveguide.

In addition, systems and techniques described herein can be used in combination with systems and techniques disclosed in U.S. provisional application 61/439,790, titled "On-Chip Two-Octave Supercontinuum Generation Enabled By Advanced Chromatic Dispersion Tailoring In Slotted Waveguides" filed Feb. 4, 2011, the same day as the filing of the present application. The disclosure of this provisional application is considered part of and is incorporated by reference in the disclosure of this application.

Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Variations, modifications, and enhancements to the described examples and implementations and other implementations may be made based on what is disclosed.

What is claimed:

1. A method for making a dispersion device that includes a slot waveguide coupled with another waveguide, the method comprising:
    obtaining one or more structural parameters for the dispersion device to cause the dispersion device to produce dispersion, having a dispersion profile, for an electromagnetic wave propagated through the dispersion device, the one or more structural parameters including one or more of a slot thickness for a slot of the slot waveguide or a spacing thickness between the slot waveguide and the other waveguide; and
    making the dispersion device, including the slot waveguide and the other waveguide, according to the structural parameters.

2. The method of claim 1, further comprising:
    obtaining a dispersion profile to be produced by the dispersion device; and
    wherein the obtaining the one or more structural parameters comprises determining the one or more structural parameters for the dispersion device to cause the dispersion device to produce dispersion having the dispersion profile.

3. The method of claim 1, wherein the other waveguide is a strip waveguide.

4. The method of claim 3, wherein the obtaining the one or more structural parameters comprises obtaining a strip waveguide thickness of the strip waveguide.

5. The method of claim 1, wherein the obtaining the one or more structural parameters comprises determining a slot thickness for the slot that corresponds to a peak wavelength of the dispersion profile.

6. The method of claim 1, wherein the obtaining the one or more structural parameters comprises determining the slot thickness for the slot to correspond to a peak dispersion value of the dispersion profile, wherein the slot thickness is inversely proportional to the peak dispersion value.

7. The method of claim 1, wherein the obtaining the one or more structural parameters comprises determining the spacing thickness between the slot waveguide and the other waveguide to correspond to a peak dispersion value, the determining based on a relationship that as the spacing layer thickness increases, the peak dispersion value increases.

8. The method of claim 1, wherein the obtaining the one or more structural parameters comprises determining two or more of the structural parameters to correspond to a predetermined wavelength of the peak of the dispersion profile and to a predetermined peak dispersion value of the dispersion profile.

9. The method of claim 1, wherein obtaining the structural parameters comprises determining a cascade of the one or more structural parameters, the cascade comprising multiple different values for a structural parameter of the one or more structural parameters.

10. The method of claim 9, wherein the obtaining the cascade of the one or more structural parameters comprises determining various widths of multiple sections of the dispersion device to tailor a breadth of a dispersion profile.

11. The method of claim 9,
    wherein the other waveguide is a strip waveguide; and
    wherein determining the cascade of the one or more structural parameters comprises determining various thicknesses of multiple sections of the strip waveguide to tailor a breadth of a dispersion profile.

12. The method of claim 9,
    wherein the dispersion profile comprises a dispersion value $D_0$; and
    wherein determining the cascade of the one or more structural parameters comprises determining length coefficients of n number of sections of the cascade by solving a linear equation, where $D_i(\lambda)$ (i=1, 2, ..., n) is a component-dispersion profile of the ith section and the tailored dispersion profile has n dispersion values clamped to $D_0$, the linear equation comprising:

$$\begin{bmatrix} D_1(\lambda_1) & D_2(\lambda_1) & \ldots & D_n(\lambda_1) \\ D_1(\lambda_2) & D_2(\lambda_2) & \ldots & D_n(\lambda_2) \\ \vdots & \vdots & \ddots & \vdots \\ D_1(\lambda_n) & D_2(\lambda_n) & \ldots & D_n(\lambda_n) \end{bmatrix} \cdot \begin{bmatrix} c_1 \\ c_2 \\ \vdots \\ c_n \end{bmatrix} = \begin{bmatrix} D_0 \\ D_0 \\ \vdots \\ D_0 \end{bmatrix}.$$

13. The method of claim 1, wherein the making comprises:
    depositing at least one of the slot waveguide or the other waveguide on a substrate; and
    coupling the dispersion device with an optical fiber to compensate for dispersion of a wave in the optical fiber.

14. The method of claim 1, wherein the making comprises:
    depositing at least one of the slot waveguide and the other waveguide on a substrate on a microchip; and
    coupling the dispersion device with an electromagnetic wave source of a system to provide tailored dispersion or tailored optical delay of an electromagnetic wave of the wave source.

15. An electromagnetic wave dispersion device comprising:
    a slot waveguide, comprising a first layer formed between a second layer and a third layer, the first layer having a first index of refraction lower than a second index of the second layer and a third index of the third layer;
    another waveguide coupled with the slot waveguide;

wherein structural parameters of the coupled slot waveguide and other waveguide cause the slot wave guide to have an effective index of refraction that is wavelength dependent and that is different than a wavelength-dependent effective index of the other waveguide, the effective index of the slot waveguide having a crossing point with the effective index of the other waveguide at a wavelength, and dispersion occurs at the wavelength in an electromagnetic wave propagated through the device.

16. The dispersion device of claim 15, wherein the other waveguide is a strip waveguide, the strip waveguide having an index of refraction higher than a surrounding environment.

17. The dispersion device of claim 15, wherein the first layer has a dimension of less than one wavelength of the electromagnetic wave guided along a direction perpendicular to a waveguide direction of the slot waveguide.

18. The dispersion device of claim 15, wherein the structural parameters of the dispersion device are predetermined to produce a predetermined dispersion profile at a predetermined wavelength in the electromagnetic wave.

19. The dispersion device of claim 18, wherein the one or more structural parameters comprise a spacing thickness of a spacing layer between the other waveguide and the slot waveguide, the spacing thickness corresponding to a peak dispersion value.

20. The dispersion device of claim 18, wherein the one or more structural parameters comprise a thickness of the first layer, the thickness of the first layer predetermined to correspond to
   a wavelength of a peak of the dispersion profile, wherein the thickness of the first layer is proportional to the wavelength of the peak, and
   a peak dispersion value of the dispersion profile, wherein the thickness of the first layer is inversely proportional to the peak dispersion value.

21. The dispersion device of claim 18,
   wherein the other waveguide is a strip waveguide; and
   wherein the one or more structural parameters comprise a strip waveguide thickness of the strip waveguide, the strip waveguide thickness has a different thickness across cross multiple sections of the strip waveguide.

22. The dispersion device of claim 18,
   wherein the dispersion device comprises a dispersion compensator, the dispersion compensator coupled with an optical fiber; and
   wherein the structural parameters are predetermined to tailor a dispersion profile to compensate for optical dispersion in the optical fiber.

23. A system comprising:
   an electromagnetic wave source; and
   a dispersion device comprising a slot waveguide coupled with another waveguide, the dispersion device coupled with the electromagnetic source such that a signal from the electromagnetic wave source is guided through the slot waveguide and the strip waveguide, the dispersion device configured to produce dispersion, with a predetermined dispersion profile, in the signal.

24. The system of claim 23,
   wherein the electromagnetic source comprises an optical fiber; and
   wherein the dispersion device comprises a dispersion compensator configured to compensate for dispersion in the signal from the optical fiber.

25. The system of claim 23,
   wherein the electromagnetic source comprises an on-chip electromagnetic source; and
   wherein the dispersion device comprises an on-chip delay device configured to produce a delay in the signal from the optical source.

26. The system of claim 23 wherein the delay device is configured to produce a predetermined delay based on a predetermined structural parameter of the delay device.

27. The system of claim 23 wherein the predetermined structural parameter comprises multiple predetermined values of the structural parameter across multiple sections of the delay device.

28. A dispersion device comprising:
   a slot waveguide, comprising a slot between a first layer and a second layer; and
   a non-slot waveguide coupled with the slot waveguide, wherein the slot waveguide and the non-slot waveguide have one or more structural parameters cascaded across multiple sections.

29. The dispersion device of claim 28, further comprising a spacing layer between the slot waveguide and the non-slot waveguide.

30. The dispersion device of claim 28, wherein the cascaded structural parameter comprises a cascaded width of the coupled slot waveguide and the non-slot waveguide.

31. The dispersion device of claim 28, wherein the cascaded structural parameter comprises a thickness of the non-slot waveguide.

32. The dispersion device of claim 28, wherein the cascaded structural parameter comprises a thickness of the first layer.

33. The dispersion device of claim 28, wherein the cascaded structural parameter is predetermined to produce a tailored dispersion profile having a dispersion value $D_0$; and
   wherein the multiple sections comprise n number of sections that have length coefficients determined by solving a linear equation, where $D_i(\lambda)$ (i=1, 2, ..., n) is a component-dispersion profile of the ith section and the tailored dispersion profile has n dispersion values clamped to $D_0$, the linear equation comprising:

$$\begin{bmatrix} D_1(\lambda_1) & D_2(\lambda_1) & \ldots & D_n(\lambda_1) \\ D_1(\lambda_2) & D_2(\lambda_2) & \ldots & D_n(\lambda_2) \\ \vdots & \vdots & \ddots & \vdots \\ D_1(\lambda_n) & D_2(\lambda_n) & \ldots & D_n(\lambda_n) \end{bmatrix} \cdot \begin{bmatrix} c_1 \\ c_2 \\ \vdots \\ c_n \end{bmatrix} = \begin{bmatrix} D_0 \\ D_0 \\ \vdots \\ D_0 \end{bmatrix}.$$

* * * * *